(12) United States Patent
Kimura

(10) Patent No.: US 7,380,738 B2
(45) Date of Patent: Jun. 3, 2008

(54) MAGNETIC TAPE DEVICE

(75) Inventor: Takashi Kimura, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 12 days.

(21) Appl. No.: 11/631,044

(22) PCT Filed: Jun. 28, 2005

(86) PCT No.: PCT/JP2005/011838

§ 371 (c)(1),
(2), (4) Date: Dec. 28, 2006

(87) PCT Pub. No.: WO2006/003890

PCT Pub. Date: Jan. 12, 2006

(65) Prior Publication Data

US 2007/0241221 A1    Oct. 18, 2007

(30) Foreign Application Priority Data

Jul. 1, 2004    (JP) .............................. 2004-196008

(51) Int. Cl.
*G11B 15/66* (2006.01)

(52) U.S. Cl. .............................. 242/332.4; 242/332.8; 242/532.1; 242/532.7

(58) Field of Classification Search ................ 242/332, 242/332.4, 332.7, 332.8, 532.1, 532.6, 532.7, 242/582

See application file for complete search history.

(56) References Cited

U.S. PATENT DOCUMENTS 5,303,875 A * 4/1994 Hoge et al. ............... 242/332.4
6,322,014 B1   11/2001 Nemeth et al.
6,427,934 B1 * 8/2002 Saliba et al. .............. 242/332.7
6,814,324 B2 * 11/2004 Gavit et al. ............... 242/332.4
7,066,420 B2 * 6/2006 Hamming ................. 242/332.4
7,195,190 B2 * 3/2007 Tsuneyoshi et al. ...... 242/332.4
2004/0129816 A1 * 7/2004 Hamming ................. 242/332.4

FOREIGN PATENT DOCUMENTS

| JP | 06-290567 | 10/1994 |
|---|---|---|
| JP | 2002-530794 A | 9/2002 |
| WO | 00/30095 A1 | 5/2000 |

* cited by examiner

*Primary Examiner*—William A Rivera
(74) *Attorney, Agent, or Firm*—Harness, Dickey & Pierce, P.L.C.

(57) ABSTRACT

The present invention provides a magnetic tape device capable of reliably securing a leader tape to a tape pull-out member with a simple structure. The tape pull-out member comprises a through hole which is extended along a direction substantially perpendicular to the pull-out direction of the leader tape, and a first shaft and a second shaft which are disposed above and below the through hole and along a direction perpendicular to the pull-out direction of the leader tape. The leader tape is folded at its end portion which is to be connected to the tape pull-out member, to thereby form the folded portion of the leader tape, and this folded portion is turned to form an opening at its top curved portion so as to allow the first shaft to pass through the opening, and is then so hung on the second shaft as to turn around the second shaft.

8 Claims, 5 Drawing Sheets

MAGNETIC TAPE DEVICE

TECHNICAL FIELD

The present invention relates to a magnetic tape device which is loaded with a tape cartridge to record and/or reproduce, and particularly to a magnetic tape device having a tape pull-out mechanism which pulls out a magnetic tape from the loaded tape cartridge and winds the magnetic tape onto a take-up reel within the magnetic tape device.

BACKGROUND OF THE INVENTION

Lately, magnetic tape devices for use with tape cartridges of mass storages intended for high-speed processing have come into wide use. A tape cartridge used in such a magnetic tape device includes a rotatable tape-supply reel onto which a magnetic tape as a recording medium is wound. The tape cartridge loaded on the magnetic tape device is configured so that the magnetic tape in the tape cartridge is pulled out by a tape pull-out mechanism provided in the magnetic tape device, and the tape pull-out mechanism winds the magnetic tape onto a take-up reel in the magnetic tape device.

A pull-out pin is attached to the leading end of the magnetic tape held in the tape cartridge, and the pull-out pin of the magnetic tape is engaged with a cavity formed in the tape pull-out mechanism, so as to pull out the magnetic tape, when the tape cartridge is loaded on the magnetic tape device. For example, JP-A-2002-530794 discloses a magnetic tape device provided with such a tape pull-out mechanism.

An existing tape pull-out mechanism of this type comprises a leader tape which is fixed at its one end to a take-up reel within a magnetic tape device, and a tape pull-out member attached to the other end of the leader tape. To fix the tape pull-out member to the other end of the leader tape, a hole is formed in the other end of the leader tape, a projection formed on the tape-joint face of the tape pull-out member is engaged with this hole of the leader tape, and a pressing member is attached so as to clamp the other end of the leader tape from the upper side of the tape-joint face of the tape pull-out member. Further, the tape pull-out member of the conventional tape pull-out mechanism is bonded to the other end of the leader tape with an adhesive or the like, and the leader tape is fixed to the tape pull-out member by using the pressing member.

Patent Literature 1: JP-A-2002-530794

DISCLOSURE OF THE INVENTION

Problems to be Solved by the Invention

As described above, in the tape pull-out mechanism of the conventional magnetic tape device, the tape pull-out member is needed to have a tape joint face formed thereon so as to fix the leader tape thereon, and a space for fixing the pressing member is further needed. For these disadvantages, it has been difficult to shape a smaller tape pull-out member for the tape pull-out mechanism in the conventional magnetic tape device for use with a tape cartridge. Further, a complicated operation is needed to fix the leader tape to the tape pull-out member of the conventional tape pull-out mechanism.

The present invention has been developed to solve the above discussed problems of the tape pull-out mechanism of the conventional magnetic tape device. An object of the present invention is therefore to provide a magnetic tape device capable of reliably fixing a leader tape to the tape pull-out member of the tape pull-out mechanism, with a simple structure, even when the tape pull-out member is shaped with a smaller size.

Means For Solving The Problems To achieve the above object, a magnetic tape device according to a first aspect of the present invention comprises a take-up reel onto which a tape-shaped recording medium held in a loaded tape cartridge is wound, a leader tape fixed at its one end to the hub of said take-up reel, a tape pull-out member connected to the other end of said leader tape and engaged with an end portion of the recording medium within said tape cartridge, and a tape driving portion which drives the take-up reel to wind the recording medium together with said leader tape and said tape pull-out member, and that said tape pull-out member has a first shaft and a second shaft disposed in parallel and along a direction substantially perpendicular to a pull-out direction of the said leader tape, and said leader tape has a folded portion formed about the end of said leader tape so as to connect to said tape pull-out member, said folded portion is turned to form an opening at its top turned portion so as to allow the first shaft to pass through the opening, and said folded portion is then turned around said second shaft to approach said first shaft. The magnetic tape device with this configuration can surely fix the leader tape to the tape pull-out member, even when the tape pull-out member of the tape pull-out mechanism is shaped with a smaller size.

A magnetic tape device according to a second aspect of the present invention may be configured so that the tape pull-out member as defined in the first aspect has a through hole which is extended along a direction substantially perpendicular to the pull-out direction of said leader tape, and that the first shaft and the second shaft are disposed in parallel to said through hole so that the folded portion of the leader tape is clamped between said first shaft and the edge forming said through hole. In the magnetic tape device with this configuration, the leader tape can be surely attached to the tape pull-out member within a smaller space.

In a magnetic tape device according to a third aspect of the present invention, the second shaft as defined in the first aspect is fixed in the through hole, and the first shaft is pressed in a direction toward said second shaft to be fitted in said through hole, when a pulling force is applied to the leader tape. The magnetic tape device with this configuration has higher reliability, since the leader tape can be surely attached to the tape pull-out member.

In a magnetic tape device according to a fourth aspect of the present invention, the second shaft as defined in the second aspect is fixed in the through hole with a clearance therebetween, and the first shaft is fitted in the through hole with substantially no clearance therebetween. In the magnetic tape device with this configuration, the leader tape can be readily and reliably attached to the tape pull-out member.

In a magnetic tape device according to a fifth aspect of the present invention, the second shaft as defined in the first and second aspects is formed integrally with the tape pull-out member. In the magnetic tape device with this configuration, the strength of the tape pull-out member is enhanced, and the number of components can be decreased so that the manufacturing of the magnetic tape device is facilitated.

In a magnetic tape device according to a sixth aspect of the present invention, the folded portion of the leader tape as defined in the first and second aspects are stuck to each other with an adhesive, except for the turned portion forming the opening at its top folded portion. In the magnetic tape device with this configuration, the leader tape can be surely attached to the tape pull-out member, and thus, this magnetic tape device can have higher reliability.

Effect of the Invention

In the magnetic tape device according to the present invention, a tape pull-out member of a tape pull-out mechanism has two shafts disposed in a direction perpendicular to the tape pull-out direction, and a folded portion of a leader tape is turned and hung on these shafts in given directions so as to cause the turned portions of the leader tape to pull each other in opposing directions of the two shafts. With this arrangement, the leader tape can be readily and surely attached to the tape pull-out member within a smaller space.

DESCRIPTION OF REFERENCE NUMERALS

Figure 1:
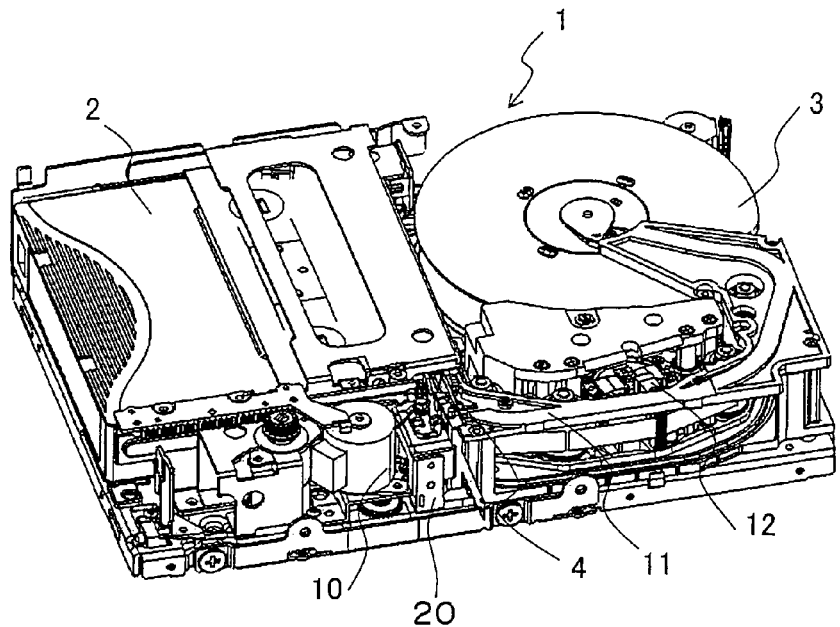
FIG. 1 shows a perspective view of a magnetic tape device according to the first embodiment of the present invention, illustrating an internal structure thereof.

1: magnetic tape device
2: tape cartridge
3: take-up reel
4: tape pull-out member
4a: through hole
4b: groove
5: leader tape
5a: folded portion
5b: opening
6: inner hub
7: pull-out pin
8: pressing member
9: magnetic tape
10: tape driving portion
11: tape transfer portion
12: recording/reproducing unit
13: first shaft
14: second shaft
15: guide rod
20: tape pull-out mechanism

BEST MODES FOR CARRYING OUT THE INVENTION preferred embodiment of a magnetic tape device provided with a tape pull-out mechanism according to the present invention will be described with reference to the accompanying drawings.

First Embodiment

Figure 2:
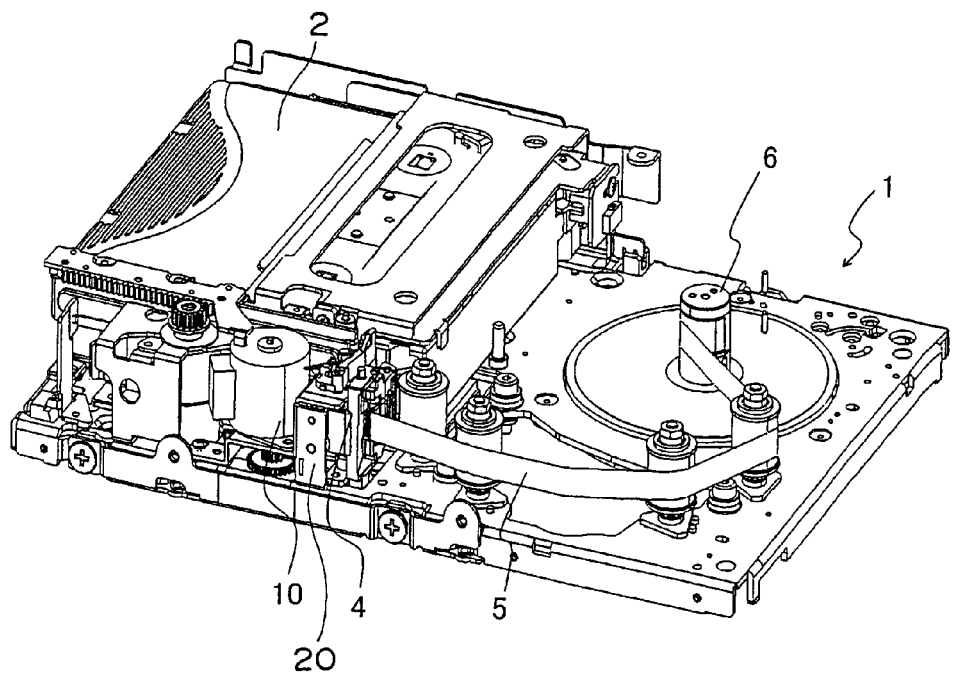
FIG. 2 shows a perspective view of the magnetic tape device according to the first embodiment of the present invention, illustrating a tape pull-out mechanism thereof.

FIG. 1 shows the perspective view of a magnetic tape device without a casing, according to the first embodiment of the present invention, illustrating the internal structure thereof. FIG. 2 shows the perspective view of the magnetic tape device according to the first embodiment, illustrating the tape pull-out mechanism thereof. As seen in FIG. 2, a part of the components are removed so as to illustrate the tape pull-out mechanism.

Figure 3:
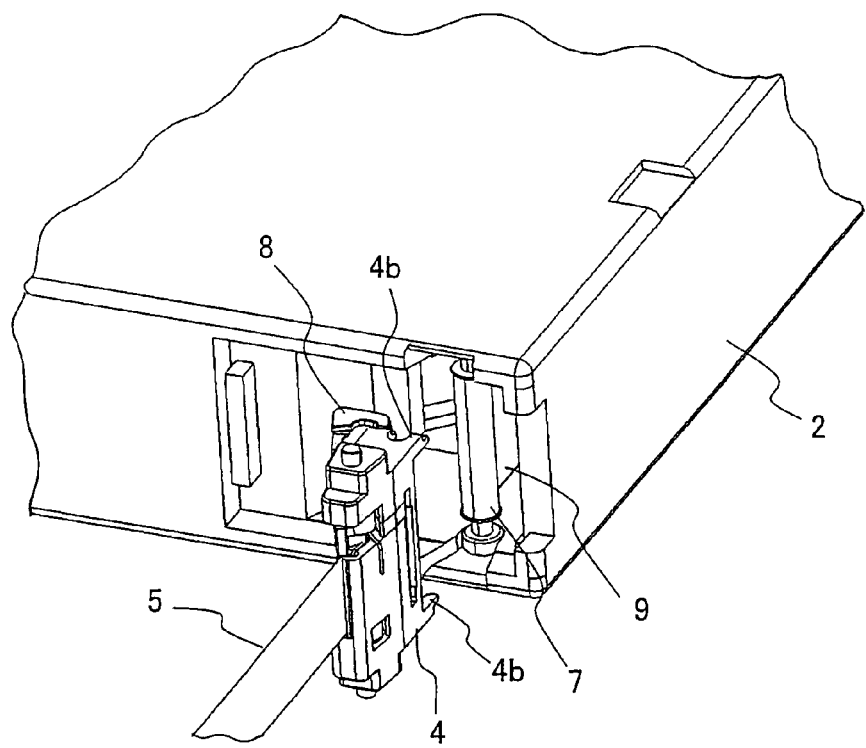
FIG. 3 shows an enlarged view of a part of the magnetic tape device according to the first embodiment of the present invention, illustrating a tape pull-out member and a leader tape of the tape pull-out mechanism, and a pull-out pin of a tape cartridge, etc.

FIG. 3 shows the enlarged perspective view of the tape pull-out mechanism, illustrating a tape pull-out member 4, a leader tape 5 and a pull-out pin 7 of a tape cartridge 2, etc.

The magnetic tape device 1 according to the first embodiment is loaded with the tape cartridge 2 which holds a magnetic tape 9 (see FIG. 3) wound onto a supply roller. This magnetic tape device 1 pulls out the magnetic tape 9 held in the tape cartridge 2, and records data on or reproduces the data from the magnetic tape 9. The magnetic tape device 1 comprises a tape pull-out mechanism 20 which pulls out or unwinds the magnetic tape 9; a take-up reel 3 (see FIG. 1) onto which the unwound magnetic tape 9 is wound; a tape driving portion 10 which drives the tape pull-out mechanism and the take-up reel 3; and a tape transfer portion 11 which feeds the magnetic tape 9 to the take-up reel 3. The magnetic tape device of the first embodiment further comprises a recording/reproducing unit which performs a recording or reproducing operation on the magnetic tape 9 which is pulled out from the tape cartridge 2 (see FIG. 1).

As shown in FIG. 2, in the magnetic tape device 1 of the first embodiment, one end of the leader tape 5 of the tape pull-out mechanism 20 is fixed to the inner hub 6 of the take-up reel 3, and the other end of the leader tape 5 is attached to the tape pull-out member 4. The tape pull-out member 4 is disposed in the vicinity of the tape cartridge 2 which is loaded on the magnetic tape device, so as to be engaged with the pull-out pin 7 disposed within the tape cartridge 2 (see FIG. 3). When the pull-out pin 7 fixed to one end of the magnetic tape 9 is engaged with the tape pull-out member 4, the leader tape 5 is wound onto the inner hub 6 of the take-up reel 3, to thereby pull out the magnetic tape 9 within the tape cartridge 2.

Figure 4:
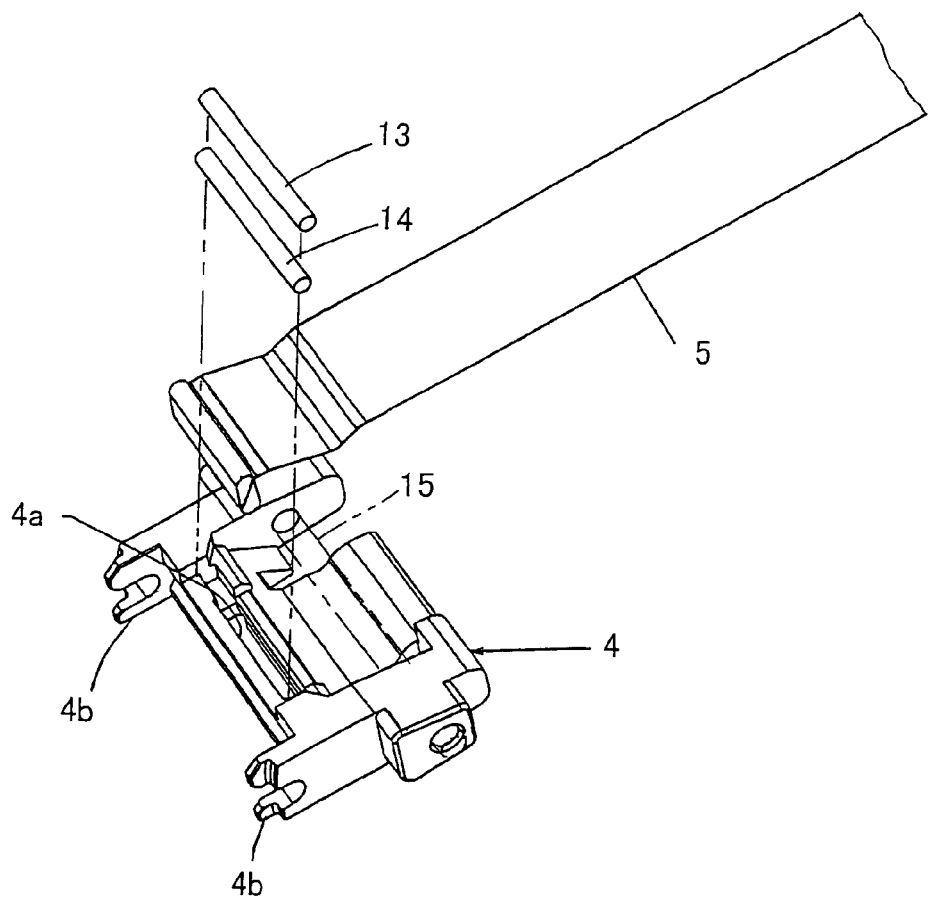
FIG. 4 shows an exploded view of the tape pull-out mechanism of the magnetic tape device according to the first embodiment of the present invention.
Figure 5:
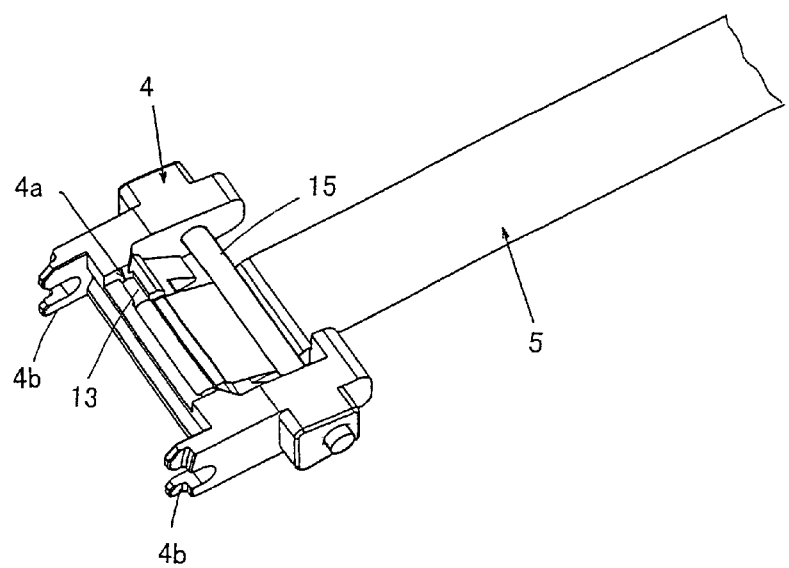
FIG. 5 shows a view of the tape pull-out mechanism of the magnetic tape device according to the first embodiment of the present invention, illustrating the assembling the same.
Figure 6:
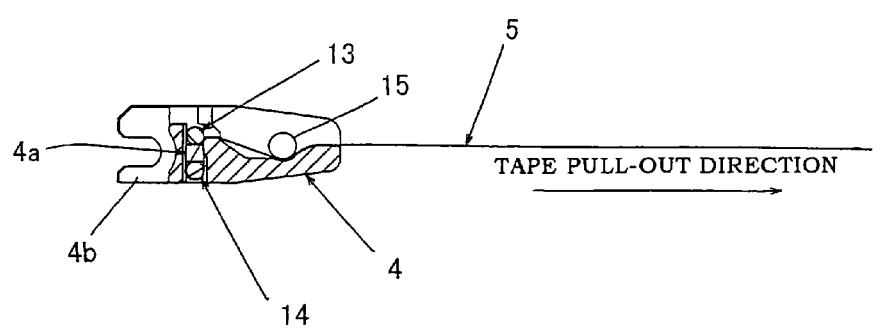
FIG. 6 shows a sectional view of the tape pull-out mechanism of the magnetic tape device according to the first embodiment of the present invention, illustrating the assembling the same.
Figure 7:
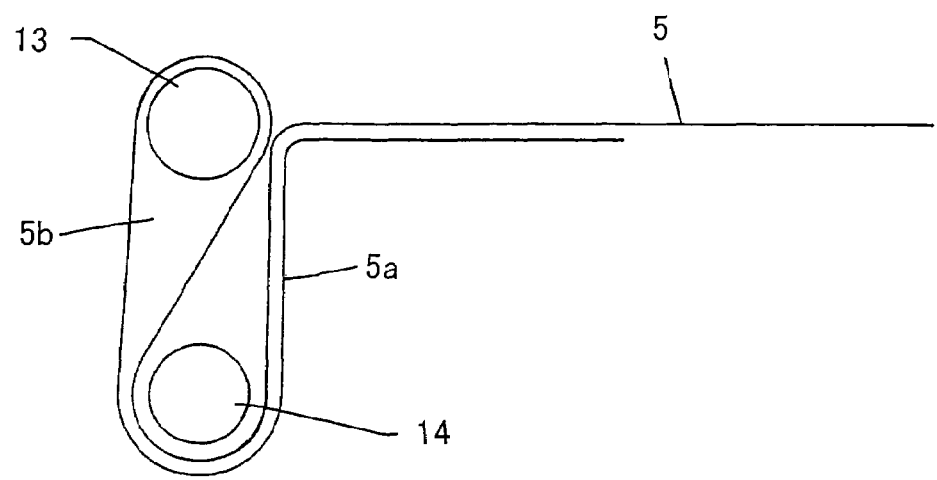
FIG. 7 shows a diagram illustrating the method of attaching the leader tape to the tape pull-out member of the magnetic tape device according to the first embodiment of the present invention.

FIG. 4 shows an exploded view which illustrates a part of the tape pull-out mechanism 20 in the magnetic tape device of the first embodiment, and FIG. 5 shows the tape pull-out mechanism 20 shown in FIG. 4, which is in the assembling. FIG. 6 shows the sectional view of the assembled tape pull-out mechanism 20. FIG. 7 shows a diagram which illustrates the method of attaching the leader tape 5 to the tape pull-out member 4.

As shown in FIG. 4, the tape pull-out member 4 has a through hole 4a extended along a direction perpendicular to the tape pull-out direction, therein, and a first shaft 13 and a second shaft 14 are disposed at the positions above and below the through hole 4a (or the positions in a direction perpendicular to the tape pull-out direction), respectively. The first shaft 13 is cylindrically formed and is tightly fitted in the through hole 4a with no clearance therebetween. Both ends of the second shaft 14 are fitted into cavities formed in the right and left sides of the through hole 4a, and thus, the second shaft 14 is fixed on the tape pull-out member 4 with a clearance between the periphery surface of the second shaft and the wall of the through hole 4a.

Further, a guide rod 15 having a shaft shape is attached to the tape pull-out member 4, and ends of the guide rod 15 projected outward through the tape pull-out member 4 are engaged with the guide grooves of the tape transfer portion, so that the guide rod 15 is caused to move on a predetermined route. The tape pull-out member 4 has U-shaped grooves 4b formed at its both ends. Both end portions of the pull-out pin 7 fixed on the leading end of the magnetic tape 9 are inserted in and engaged with these U-shaped grooves 4b. After the pull-out pin 7 has been inserted at its both end portions into these U-shaped grooves 4b, the pressing member 8 (see FIG. 3) is driven by another driving means (not shown) to thereby close the U-shaped grooves 4b. Thus, the pull-out pin 7 is surely clamped by the tape pull-out member 4.

The assembling method of the tape pull-out mechanism 20 in the magnetic tape device which is configured as mentioned above, particularly method for joining the tape pull-out member 4 to the leader tape 5, is described below.

Firstly, the leader tape 5 is folded at its end portion to form a folded portion 5a. The folded portion 5a is inserted through the through hole 4a from the upper side of the tape pull-out member 4, (or from the position where the first shaft 13 is arranged) to the downward, and is then turned around the second shaft 14 and again inserted through the through hole 4a to the upward. The first shaft 13 is allowed to pass through an opening 5b which is formed in the turned top portion of the folded portion 5a of the leader tape 5 which has been turned around the second shaft 14. FIG. 7 shows a schematic diagram of the folded portion 5a of the leader tape 5, in which the folded portion 5a has been turned around the second shaft 14 and attached to the first shaft 13. The folded portion 5a of the leader tape 5 is stuck to each other with an adhesive, except for the turned portion forming the above opening 5b (which the first shaft 13 is allowed to pass through).

In the leader tape 5 which is attached as mentioned above, when a pulling force is applied to the leader tape 5 attached as above from the inner hub of the take-up reel 3, the first shaft 13 is forced in a direction to approach the second shaft 14. Then, the first shaft 13 acts to clamp the leader tape 5 between its surface and the corner portions (or the edge) forming the through hole 4a of the tape pull-out member 4. Accordingly, the leader tape 5 is perfectly prevented from removing from the tape pull-out member 4, even if pulled with a strong force. On the other hand, even when the force applied to the leader tape 5 is stopped, the leader tape 5 is prevented from removing from the tape pull-out member 4, because the first shaft 13 is surely fitted in the through hole 4a to thereby maintain the clamping action to the leader tape 5 between the surface of the first shaft 13 and the corner portions of the through hole 4a of the tape pull-out member 4.

In the first embodiment, the second shaft 14 is fitted in and secured to the cavities formed in the right and left sides of the though hole 4a. Otherwise, the second shaft 14 may be formed integrally with the tape pull-out member 4 in the course of the molding of the tape pull-out member 4.

Further, in the first embodiment, the folded portion 5a of the leader tape 5 is stuck to each other with an adhesive as an example. However, such folded portions of the leader tape are not necessarily stuck to each other with an adhesive, since the structure of the present invention makes it possible to ensure the fixing strength for the leader tape 5 to the tape pull-out member 4.

INDUSTRIAL APPLICABILITY

The present invention is usefully applied to a magnetic tape device provided with a tape pull-out mechanism for use with a tape cartridge intended for a mass storage and high-speed processing.

The invention claimed is:

1. A magnetic tape device comprising
a take-up reel onto which a tape-shaped recording medium held in a loaded tape cartridge is wound,
a leader tape fixed at its one end to the hub of said take-up reel,
a tape pull-out member connected to the other end of said leader tape and engaged with an end portion of the recording medium within said tape cartridge, and
a tape driving portion which drives said take-up reel to wind the recording medium together with said leader tape and said tape pull-out member, and that
said tape pull-out member has a first shaft and a second shaft disposed in parallel and along a direction substantially perpendicular to a pull-out direction of said leader tape, and
said leader tape has a folded portion formed about the end of said leader tape so as to connect to said tape pull-out member, said folded portion is turned to form an opening at its top turned portion so as to allow said first shaft to pass through the opening, and said folded portion is then turned around said second shaft to approach said first shaft.

2. The magnetic tape device according to claim 1, wherein said tape pull-out member has a through hole which is extended along a direction substantially perpendicular to the pull-out direction of said leader tape, and wherein said first shaft and said second shaft are disposed in parallel to said through hole so that said folded portion of the leader tape is clamped between said first shaft and the edge forming said through hole.

3. The magnetic tape device according to claim 2, wherein said second shaft is fixed in said through hole with a clearance therebetween, and wherein said first shaft is fitted in said through hole with substantially no clearance therebetween.

4. The magnetic tape device according to claim 2, wherein said second shaft is formed integrally with the tape pull-out member.

5. The magnetic tape device according to claim 2, wherein said folded portion of the leader tape is stuck to each other with an adhesive, except for the turned portion forming said opening at its top folded portion.

6. The magnetic tape device according to claim 1, wherein said second shaft is fixed in the through hole, and wherein, by applying a pulling force to the leader tape, the first shaft is pressed in a direction toward said second shaft to be fitted in said through hole.

7. The magnetic tape device according to claim 1, wherein said second shaft is formed integrally with the tape pull-out member.

8. The magnetic tape device according to claim 1, wherein said folded portion of the leader tape is stuck to each other with an adhesive, except for the turned portion forming said opening at its top folded portion.

* * * * *